United States Patent
Shizuya et al.

(10) Patent No.: US 7,690,008 B2
(45) Date of Patent: Mar. 30, 2010

(54) OPTICAL DISC DRIVE HAVING OPENINGS IN THE HOUSING TO ALLOW AIR THEREIN

(75) Inventors: Mitsutaka Shizuya, Ryugasaki (JP); Ikuo Nishida, Ebina (JP); Hisahiro Miki, Chigasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 675 days.

(21) Appl. No.: 11/236,056

(22) Filed: Sep. 26, 2005

(65) Prior Publication Data
US 2006/0265721 A1 Nov. 23, 2006

(30) Foreign Application Priority Data
May 20, 2005 (JP) .............................. 2005-147499

(51) Int. Cl.
*G11B 17/03* (2006.01)
*G11B 17/04* (2006.01)
*G11B 33/02* (2006.01)
*H05K 7/20* (2006.01)
*H02B 1/01* (2006.01)

(52) U.S. Cl. .................... 720/601; 361/692; 361/831
(58) Field of Classification Search ................ 720/601; 95/58; 361/692, 831
See application file for complete search history.

(56) References Cited

U.S. PATENT DOCUMENTS

| 6,639,886 B1* | 10/2003 | Cook et al. ................. 720/649 |
| 2004/0158844 A1* | 8/2004 | Ohta et al. ................. 720/603 |
| 2005/0193404 A1* | 9/2005 | Omori et al. ................ 720/648 |
| 2005/0198654 A1* | 9/2005 | Muta et al. .................. 720/601 |
| 2006/0064710 A1* | 3/2006 | Huang et al. ................ 720/649 |
| 2006/0072382 A1* | 4/2006 | Wakabayashi et al. ... 369/44.11 |
| 2006/0184951 A1* | 8/2006 | Shizuya et al. ............. 720/601 |

FOREIGN PATENT DOCUMENTS

| JP | 04195885 A | * | 7/1992 |
| JP | 04-358389 A | | 12/1992 |
| JP | 2003-151259 | | 5/2003 |
| JP | 2003151259 A | * | 5/2003 |
| JP | 2004-241024 | | 8/2004 |

\* cited by examiner

*Primary Examiner*—Andrea L Wellington
*Assistant Examiner*—Adam B Dravininkas
(74) *Attorney, Agent, or Firm*—Townsend and Townsend and Crew LLP

(57) ABSTRACT

An optical disc drive may include a tray movable for the sake of mounting and dismounting a disc, a disc rotation mechanism arranged at the center to rotate the disc, and a pickup arranged on a backside of the center to write and read the disc within a housing. The optical disc drive may be arranged with a first opening for inhaling outside air in a height range between the bottom surface of the tray and the proximity to the bottom end of the pickup on a back surface or a side surface around a corner on a right side viewed from the backside of the housing, and a second opening for exhausting internal air, arranged higher than a top surface of the tray on the back surface or a side surface around a corner on a left side viewed from the backside.

1 Claim, 12 Drawing Sheets

UP SIDE

LEFT SIDE
(VIEWED FROM
BACKSIDE)

RIGHT SIDE
(VIEWED FROM
BACKSIDE)

DOWN SIDE

OPTICAL DISC DRIVE HAVING OPENINGS IN THE HOUSING TO ALLOW AIR THEREIN

BACKGROUND OF THE INVENTION

The present invention relates to an optical disc drive for recording and/or playing an optical disc medium such as a CD and a DVD.

JP-A-2003-151259 and JP-A-2004-241024 disclose an example of an optical disc drive for a conventional desktop-type personal computer and for an optical disc recorder/player, which example has the structure in which outside air is introduced for the inside cooling of the drive without using a cooling fan. The optical disc drive disclosed in JP-A-2003-151259 discharges air from an opening arranged on a back surface, opposite to a drive panel, of a cover member forming an external surface of the drive, preferably arranged in a position near its top and near a corner into which an internal air induced by disc rotation in the disc drive flows, and inhales the outside air into the drive from a gap on matching surfaces of exterior components including the cover member. The optical disc drive disclosed in JP-A-JP-A-2004-241024 has a disc accommodating room formed by a housing and a lower bulkhead for accommodating a disc drive mechanism, so that the outside air is inhaled from an opening on a side surface (front surface or back surface) of the housing under the bulkhead, and then introduced through a guide pathway into the disc accommodating room from an opening in the bulkhead formed around a rotation center of the disc, and finally discharged to the outside from an opening in a side surface (back surface) of the housing.

BRIEF SUMMARY OF THE INVENTION

Both JP-A-2003-151259 and JP-A-2004-241024 can achieve inside cooling of a disc drive as a whole, however, those are not so effective for cooling a pickup, which becomes particularly hot within a disc drive.

An object of the present invention is to cool effectively a pickup, which becomes particularly hot within an optical disc drive. Another object of the invention is to prevent adverse effects caused by irruption of dust within the introduced air, while keeping high cooling performance.

In order to achieve the above objects, the present invention is characterized by comprising: a housing; a tray able to be drawn from a front surface of the housing to place a disc on a top surface thereof; a disc rotation mechanism arranged under the proximity to the top surface of the tray within the housing to rotate the disc clockwise viewed from above; and a pickup arranged under the tray behind a rotation axis of the disc rotation mechanism in the housing being movable frontward and backward of the housing, wherein the tray is almost in an rectangular shape which partitions the housing in a vertical direction and has an internal opening extending between the proximity to the rotation axis of the disc rotation mechanism and a moving range of the pickup, and the housing has a first opening placed in an area of a back surface thereof at least including a right side viewed from its backside or in an area of a right side surface thereof behind a front end of the pickup, and in a height range between a bottom surface of the tray and the proximity to a bottom end of the pickup, and a second opening placed in an area of the back surface thereof at least including a left side viewed from the backside or in an area of a left side thereof behind the backside of the front end of the pickup, and in a height range between the top surface of the housing and the top surface of the tray.

Accordingly, since the first opening is located lower than the tray on the back surface or the side surface near a corner on the right side viewed from the backside, the outside air having entered from the first opening flows smoothly so as to be sucked out through an internal opening at the center of the tray by a strong flow of internal air generated in an upper part of the tray and then goes toward the corner on the left side viewed from the backside. Also, since the lower portion of the housing under the tray is entirely under low-pressure, a flow resistance on an intake side is low. Further, since the second opening is located in the upper portion of the tray where the strong flow of internal air toward the corner on the left side from the disc viewed from its backside is concentrated, the flow resistance on an exhaust side is also low. Therefore, it is possible to introduce large amount of outside air and consequently improve inside cooling performance of the drive by simply arranging the intake and exhaust openings at appropriate positions. Furthermore, since the first opening is located on the back surface or the side surface near the corner on the right side viewed from the backside at the height between the bottom surface of the tray and the proximity to the bottom end of the pickup, inhaled outside air flows horizontally and gradually upward toward the rotation center of the disc and most of it reaches the pickup, and changes its direction significantly by suction into the internal opening at the center of the tray to flow into the upper portion of the tray. Thus, it is possible, with the simple configuration, to lead the inhaled cold outside air to the proximity to the pickup which becomes particularly hot, and blow it without dispersing it so much so as to cool the pickup effectively.

According to the present invention, it is possible to cool efficiently the pickup, which becomes particularly hot, without using a cooling fan.

Other objects, features and advantages of the invention will become apparent from the following description of the embodiments of the invention taken in conjunction with the accompanying drawings.

DETAILED DESCRIPTION OF THE INVENTION

Hereinafter, some embodiments of the present invention will be described with reference to the drawings.

Embodiment 1

Figure 1:
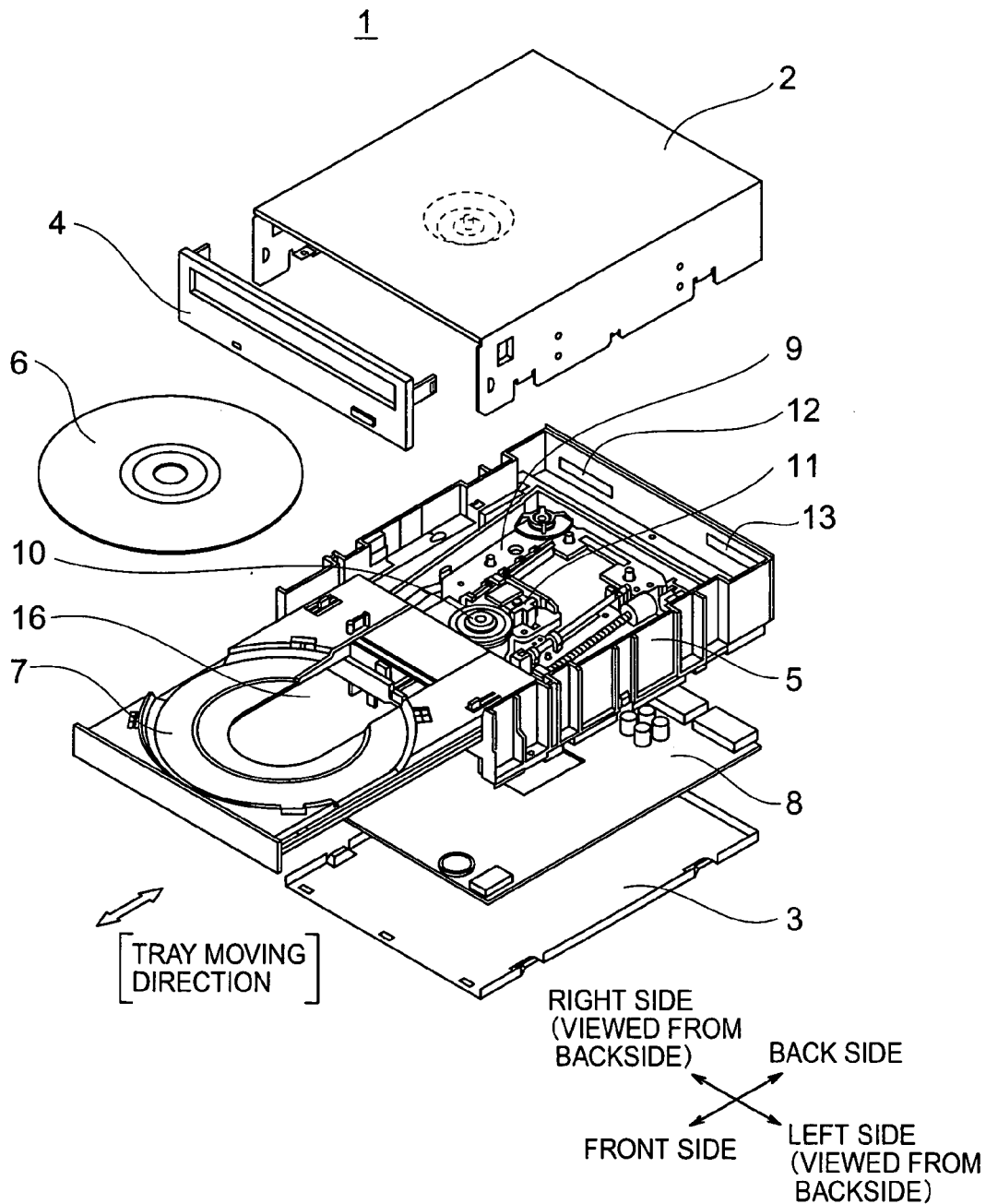
FIG. 1 is an exploded perspective view showing a general configuration of an embodiment of an optical disc drive according to the present invention.
Figure 2:
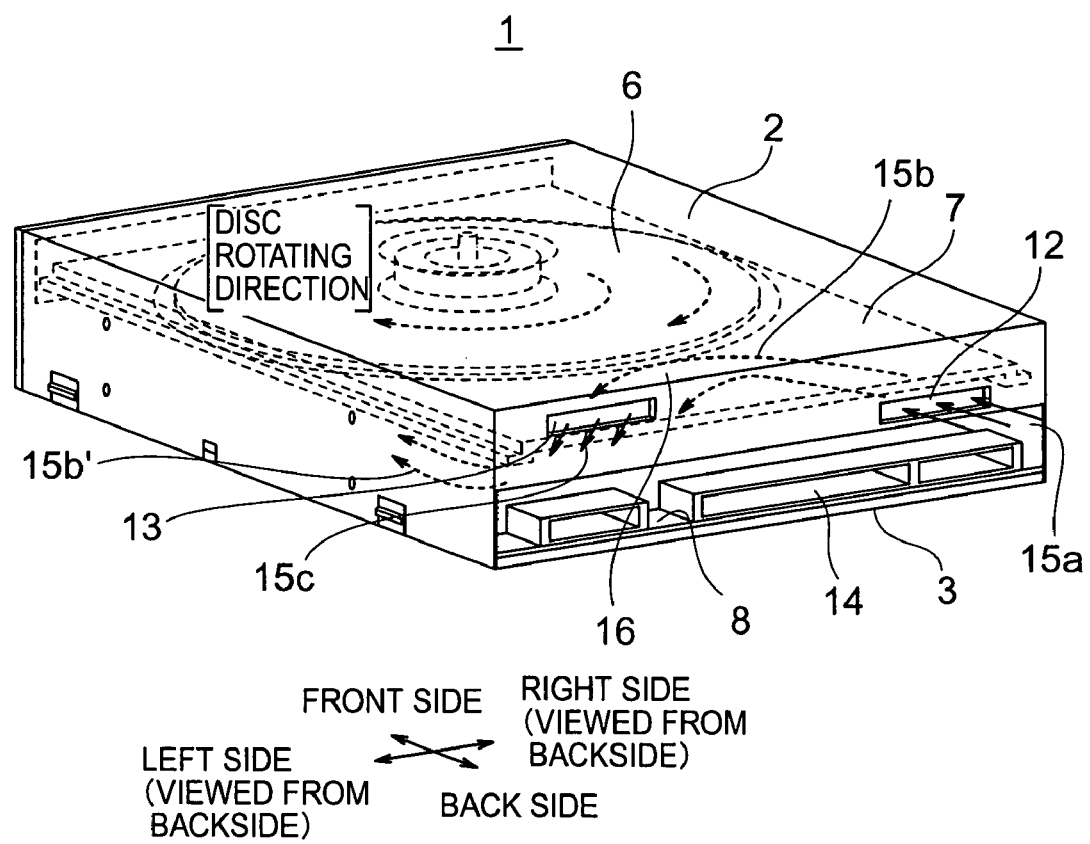
FIG. 2 is an outside perspective view of the optical disc drive shown in FIG. 1.
Figure 3:
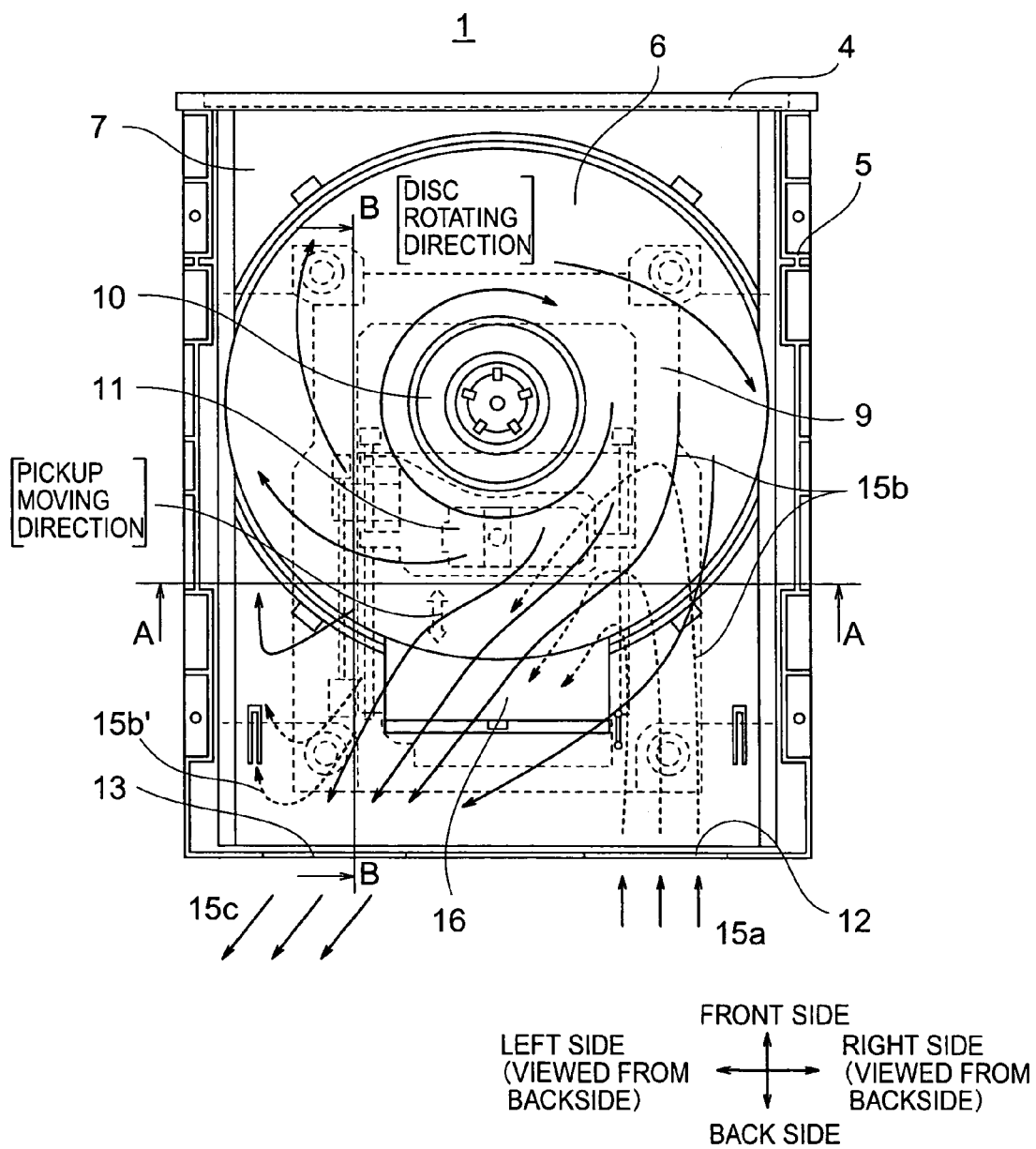
FIG. 3 is a partially omitted plane view of the optical disc drive shown in FIG. 1.
Figure 4:
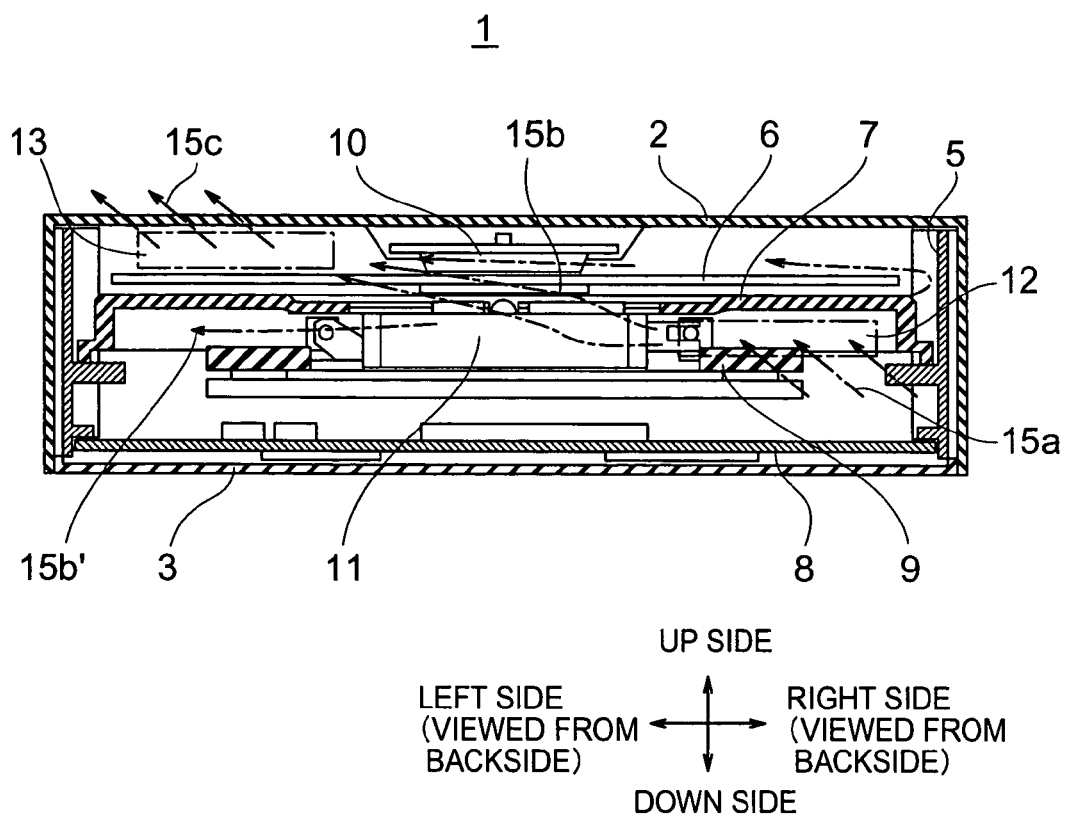
FIG. 4 is an A-A sectional view of FIG. 3.
Figure 5:
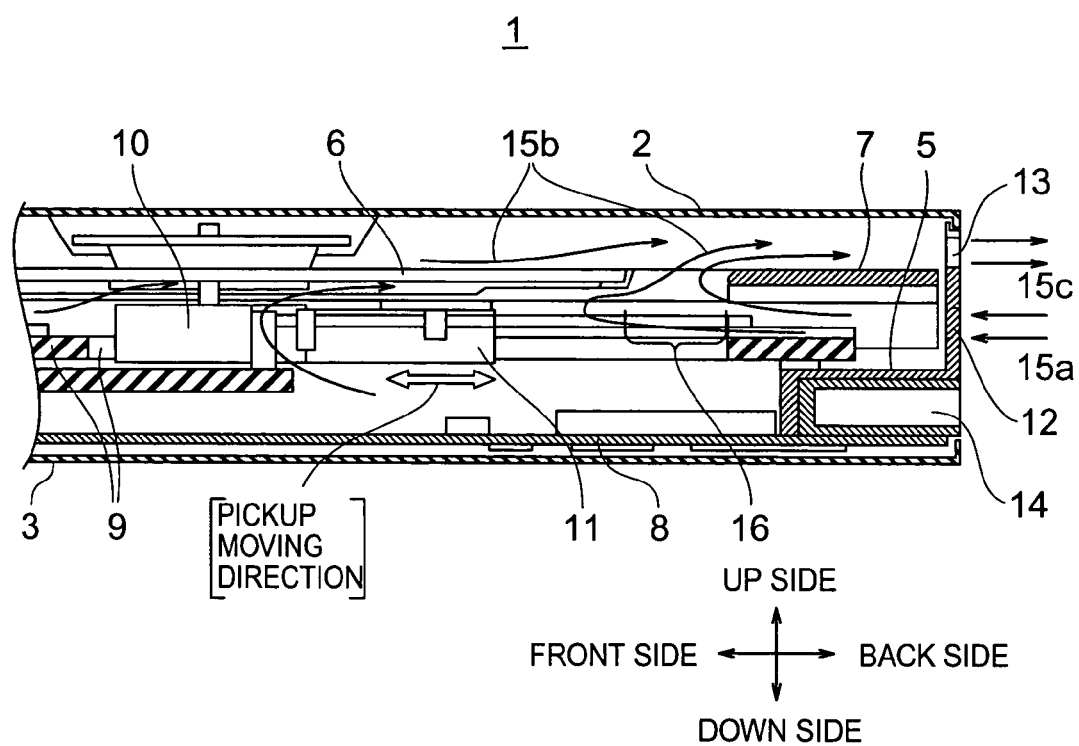
FIG. 5 is a B-B sectional view of FIG. 3.

FIG. 1 is an exploded perspective view showing a general configuration of an embodiment of an optical disc drive according to the present invention. FIG. 2 is an outside perspective view of the optical disc drive shown in FIG. 1, FIG. 3 is a partially omitted plane view excluding its top cover, FIG. 4 is an A to A sectional view of FIG. 3, and FIG. 5 is a B to B sectional view of FIG. 3. This embodiment and the following embodiments will describe an optical disc drive 1 in a form to be mounted mainly on a desktop-type personal computer.

The optical disc drive 1 has a housing of which top and side surfaces is covered with a top cover 2, of which a bottom surface is covered with a bottom cover 3, of which a front surface is covered with a front panel 4, and of which a back surface is covered with a mechanical block 5 (which forms a framework extending to the inside of the front and side surfaces). It the housing, a tray 7 on which a disc 6 is to be mounted is accommodated in a somewhat upper part, a printed circuit board 8 which performs signal processing, power supply, etc., is accommodated in the lowest part, and a mechanism chassis 9 with each mechanism described later is accommodated therebetween. The tray 7 is movable toward a front side for the sake of mounting and dismounting the disc 6, and has the structure in which its right and left end faces are supported by the mechanical block 5 so that the housing is partitioned in a vertical direction. In an internal opening 16 inside the tray 7, a disc rotation mechanism portion 10 for rotating the disc 6 (generally in a clockwise direction viewed from the above) and a pickup 11 having an optical system such as a laser for writing and reading information on the disc 6 (while moving from the vicinity of the disc rotation mechanism portion to a backside in general) are placed in such a way that those are fixed to the mechanical chassis 9. The disc rotation mechanism portion 10, the pickup 11 and respective mechanisms for moving, mounting and dismounting, etc., are connected by the printed circuit board 8 and a flexible printed circuit board (not shown) in the lowest part of the housing to perform the signal processing and the power supply. The printed circuit board 8 is connected to internal wiring of the personal computer via a connecting part 14 in the lower part of the back surface of the housing. In a state of being mounted in the personal computer, portions from the front surface up to the center in depth of the top surface, the lower surface and the right and left side surfaces of the optical disc drive 1 are mostly covered with a fixing part to the inside of the personal computer. At the time of writing and/or reading of the disc 6, the optical system of the pickup 11, the disc rotation mechanism portion 10 and the printed circuit board 8 generate heat within the optical disc drive 1, and particularly under the condition of a high recording speed or a large number of recording discs, there is a possibility that a component such as a laser may exceed a guaranteed temperature as to the pickup 11 having generally the highest heating density in the housing. Therefore, internal cooling of the optical disc drive 1 requires effective cooling for decrease the temperature of the pickup 11 which becomes particularly, as well as improvement in cooling performance for decreasing the inside temperature of housing.

In this embodiment, a first opening 12 for outside air 15$a$ is arranged on the back surface on the right side viewed from the backside of the housing and in the height range between the bottom surface of the inside tray 7 and the vicinity of the bottom end of the pickup 11, and a second opening 13 for internal air 15$b$ is arranged on the back surface on the left side viewed from the backside and higher than the top surface of the tray 7. In general, at the time of the writing and/or reading of the disc 6, the disc 6 rotates in a little higher portion than the tray 7 and generates a rotating flow in surrounding internal air 15$b$. Therefore, in an area higher than the tray 7, pressure becomes high on an outer circumference side of the disc 6, and a strong flow of internal air 15$b$ is formed toward a corner on the left side viewed from the backside of the housing. On the other hand, an area under the tray 7 is partially connected with surroundings of the disc 6 via the internal opening 16 at the center of the tray 7, however, since the opening 16 extends from an inner circumference to an outer circumference of the disc 6 and is narrow in width, the pressure in the area becomes lower than that in the upper part. Further, due to influence of the strong flow of internal air 15$b$ in the upper part of the tray 7, a flow around the opening 16, which is sucked out into the upper part on the right side viewed from the backside (closer to the inner circumference of the disc) and a flow of circulating internal air 15$b'$, which leaks toward the left corner from the upper part on the left side (closer to the outer circumference of the disc) are formed, however, those are no more than weak flows as a whole.

By arranging the first opening 12 and the second opening 13 as described above, firstly on the intake side, outside air 15$a$ flows from the first opening 12 toward the rotation center of the disc 6 horizontally and then gradually upward, so that most thereof smoothly flows to reach the pickup 11 without being much dispersed, where its direction is significantly changed by the flow sucked out from the internal opening 16 toward the upper part, thereby it flows into the upper part of the tray so as to flow together with internal air 15$b$. Since the flow from the first opening 12 to the opening 16 goes smoothly, and the lower part of the tray 7 is partitioned from the upper part to generate low pressure on the back surface and side surfaces, a flow resistance is low on the intake side. It is also possible to lead the introduced cold outside air 15$a$ to the vicinity of the pickup 11 which becomes particularly hot and blow it without dispersing it so much. On the other hand, on the exhaust side, since the second opening 13 is located at a position where the strong flow of internal air 15$b$ from the disc 6 in the upper part of the tray toward the corner on the left side is concentrated, it is possible to smoothly discharge internal air 15$b$ from the second opening 13 as exhaust air 15$c$, so that the flow resistance on the exhaust side is also low. Therefore, it is possible to reduce the flow resistances on the intake side and the exhaust side by means of the simply arranging the first opening 12 and the second opening 13 at appropriate positions so as to introduce large amount of air, and consequently improve the inside cooling performance of the drive. At the same time, it is also possible to concentrate the cold outside air 15$a$ on the pickup 11, which becomes particularly hot, without dispersing it so much, so that effective cooling of the pickup 11 is achieved. In this embodiment, the first opening 12 is placed only on the right side and the second opening 13 is placed only on the left side in the back surface viewed from the backside. However, even in the case of extending the widths of the openings toward the center or opposite side respectively or adding another openings, similar actions and effects of the openings at the original positions are maintained, so that the same improvement in performance and effect can be obtained of the inside cooling of the drive.

Embodiment 2

Figure 6:
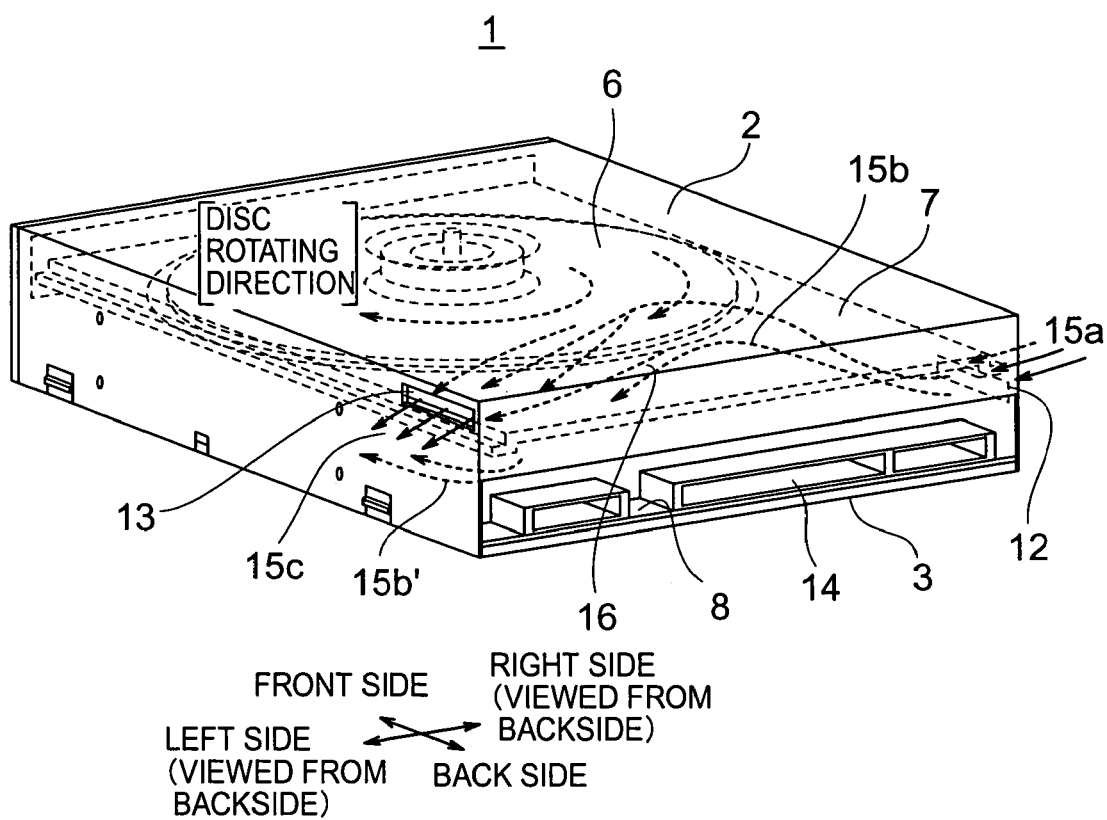
FIG. 6 is an outside perspective view of another embodiment of the optical disc drive according to the present invention.
Figure 7:
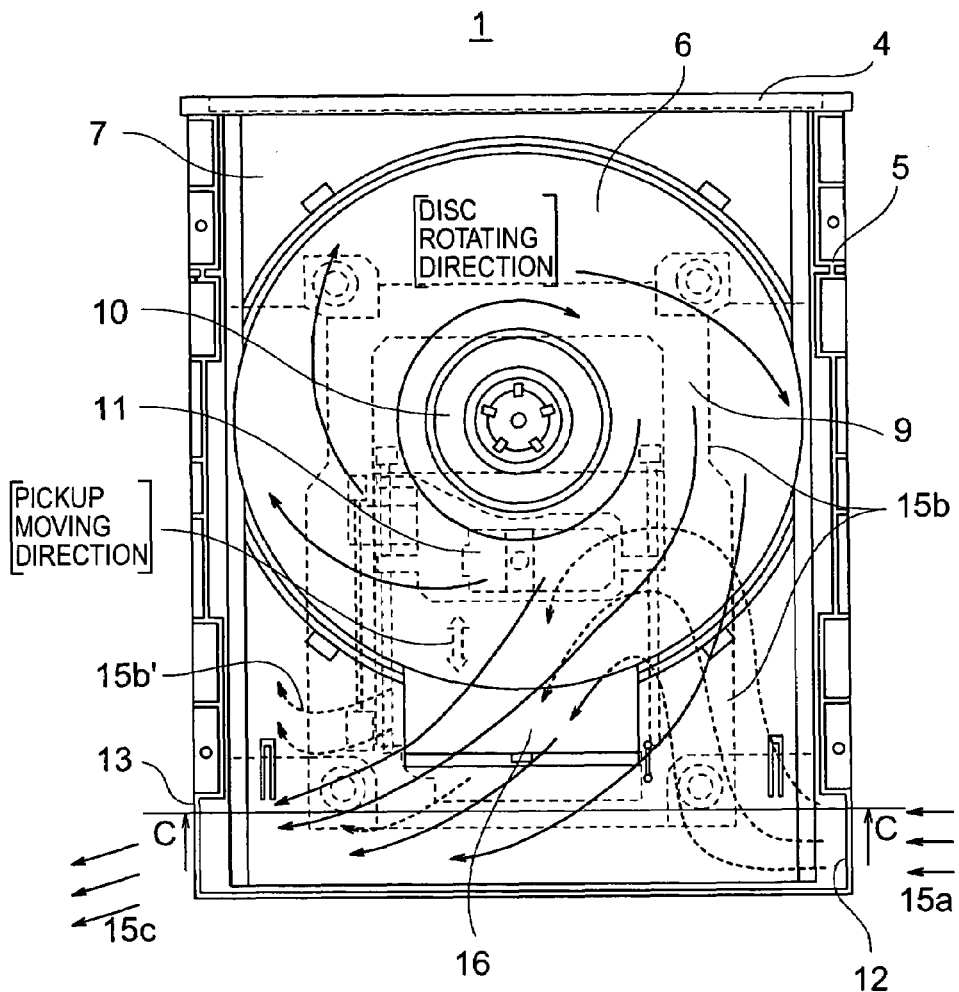
FIG. 7 is a partially omitted plane view of the optical disc drive shown in FIG. 6.
Figure 8:
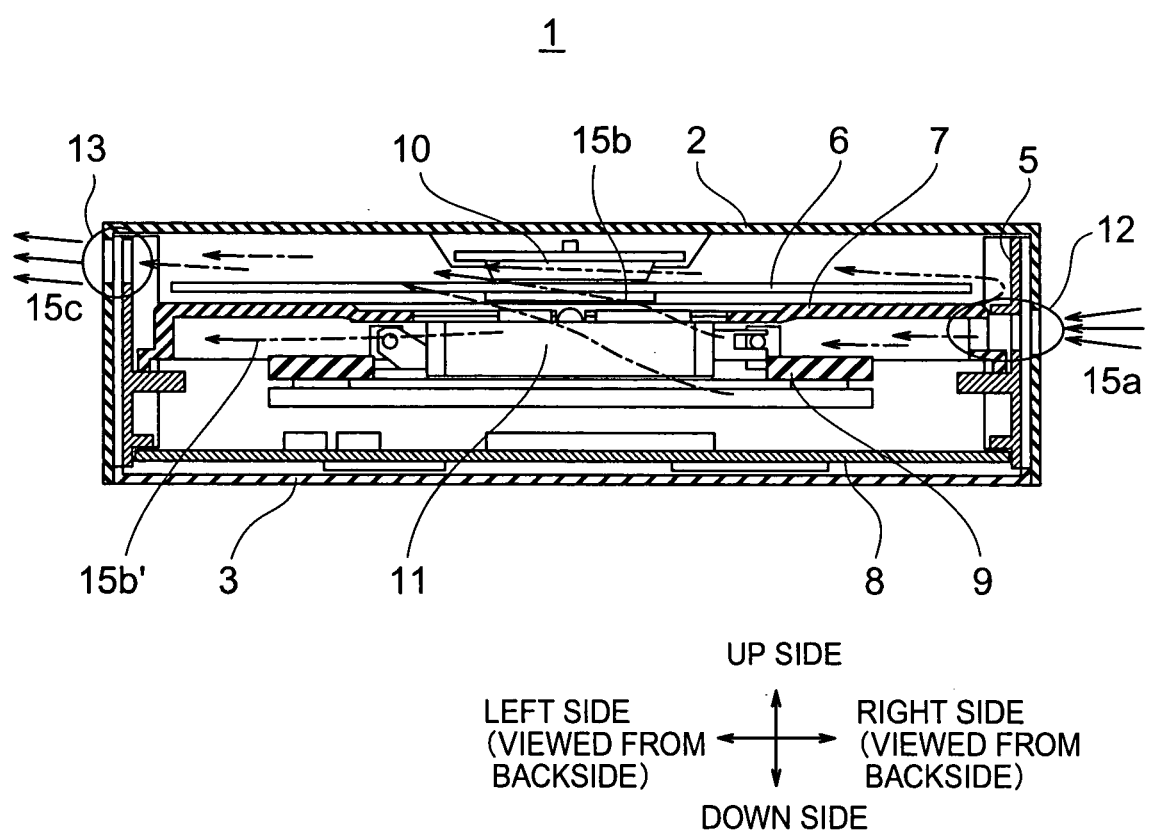
FIG. 8 is a C-C sectional view of FIG. 7.

Another embodiment of the optical disc drive according to the present invention will be described with reference to FIGS. 6 to 8. FIG. 6 is an outside perspective view of the optical disc drive, FIG. 7 is a partially omitted plane view of the optical disc drive shown in FIG. 6 excluding its top cover, and FIG. 8 is a C to C sectional view of FIG. 7. In this and subsequent embodiments, each component of the optical disc drive will be denoted in common by the same reference numeral as in the first embodiment, and descriptions of those operations and structures will be given mainly as to the points different from those in the first embodiment.

According to this embodiment, the first opening 12 to inhale outside air 15a is arranged in the height range between the bottom surface of the tray 7 and the proximity to the bottom end of the pickup 11 on the side surface near the corner on the right side viewed from the backside. The second opening 13 to discharge internal air 15b is arranged to be higher than the top surface of the tray 7 on the side surface near the left corner viewed from the backside. Compared with the first embodiment already described, only the positions of the first opening 12 and the second opening 13 are changed from the back surface to the side surface near the corner on the same side respectively viewed from the backside. It is considered that the second embodiment has no substantial difference from the first embodiment as to the positional relationship of the components inside the drive and as to the flow state of internal air 15b originally formed, therefore the same actions and effects of the inside cooling of the drive by introducing outside air can be obtained. Thus, also in this embodiment, it is possible to introduce large amount of air to cool efficiently the components which becomes particularly hot, as well as to improve the inside cooling performance in the inside of the drive by simple configuration.

Embodiment 3

Figure 9:
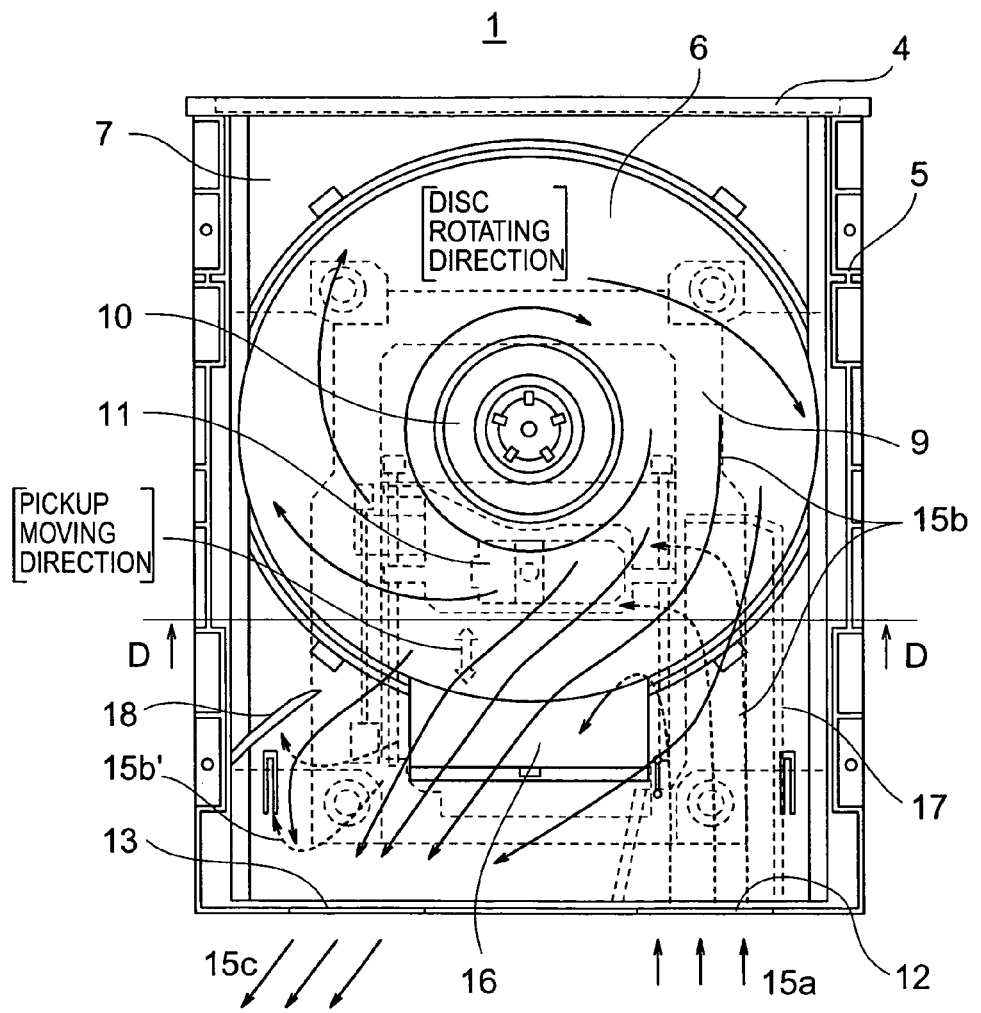
FIG. 9 is a partially omitted plane view of a further embodiment of the optical disc drive according to the present invention.
Figure 10:
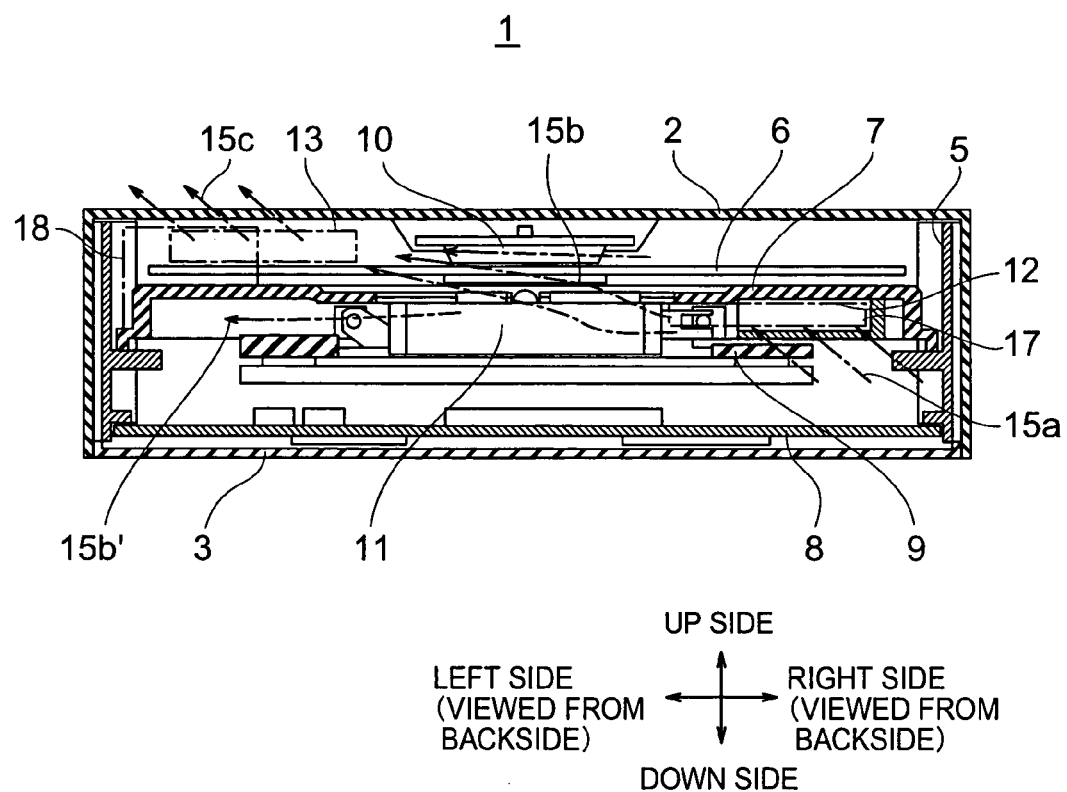
FIG. 10 is a D-D sectional view of FIG. 9.

A further embodiment of the optical disc drive according to the present invention will be described with reference to FIGS. 9 and 10. FIG. 9 is a partially omitted plane view of the optical disc drive excluding its top cover, and FIG. 10 is a D to D sectional view of FIG. 9.

According to this embodiment, the first opening 12 and the second opening 13 are arranged in the similar positions to the first embodiment, and there are additions of an intake rectifying member 17 extending like a duct from the opening on an inner surface of the first opening 12 to the proximity to the pickup 11, and an exhaust rectifying member 18 extending like a plate from the mechanical block 5 to the outer circumference of the disc 6 between the top surface of the tray 7 and the inner surface of the top cover 2 on the left side viewed from the backside. The intake rectifying member 17 has an opening on the side surface corresponding to a moving range of the pickup 11 so that it can lead outside air 15a entering from the first opening 12 and blow it to the proximity to the pickup 11 which becomes particularly hot without dispersing it. The flow of internal air 15b directed to the corner on the left side from the disc 6 in the upper part of the tray 7 can be led more smoothly to the opening on the inner surface of the second opening 13 by the exhaust rectifying member 18. The actions and effects of the inside cooling of the drive by the first opening 12 and the second opening 13 are similar to those in the first embodiment, and are intensified by additions of the intake rectifying member 17 and the exhaust rectifying member 18. Thus, also in this embodiment, it is possible to introduce large amount of air to cool more efficiently the components which will become particularly hot, as well as to improve further the inside cooling performance of the drive by simple configuration.

Embodiment 4

Figure 11:
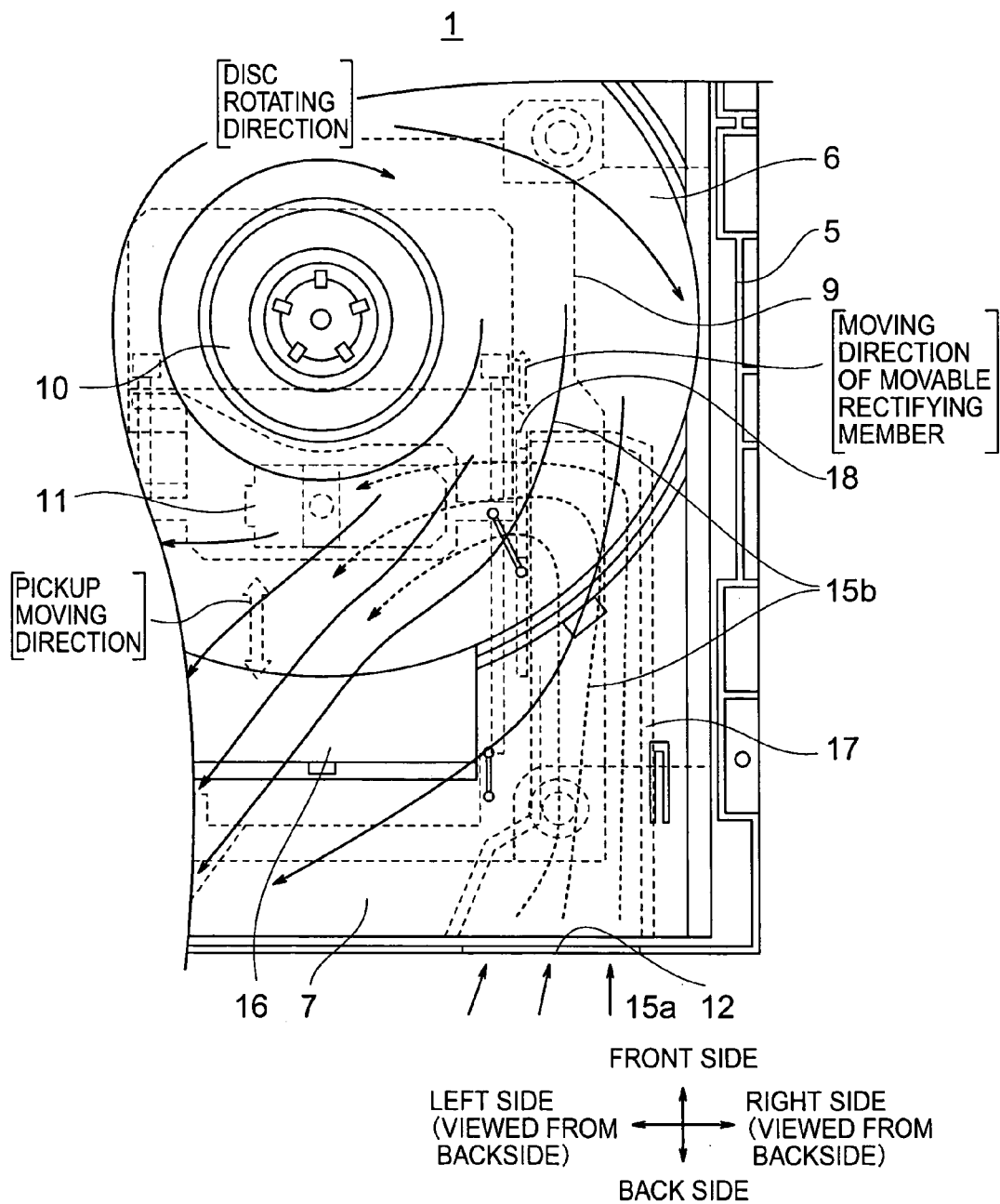
FIG. 11 is a partially omitted partial plane view of a still further embodiment of the optical disc drive according to the present invention.

FIG. 11 is a partially omitted partial plane view of a still further embodiment of the optical disc drive according to the present invention excluding its top cover, which shows a right-side rear half portion viewed from the backside of the housing.

This embodiment has a similar configuration to the third embodiment, and a movable rectifying member 19 which has an opening formed in the range almost opposed to the pickup 11 on a side surface corresponding to a moving range of the pickup 11 is combined with the duct-like intake rectifying member 17 extending to the inside of the housing of the first opening 12, and is adapted to move in conjunction with the pickup 11. By such combination, it is possible to lead cold air 15a entered from the first opening 12 to the proximity to the pickup 11 which becomes particularly hot without dispersing it, and to securely blow almost all of it whatever position the pickup 11 moves to. Consequently, it is possible to cool the pickup 11 which will becomes particularly hot more efficiently in comparison to the third embodiment. According to this embodiment, the other configurations are similar to those of the third embodiment. Thus, it is possible to introduce large amount of outside air to improve further the inside cooling performance of the drive, as well as to cool more efficiently the components which becomes particularly by simple configuration.

Embodiment 5

Figure 12:
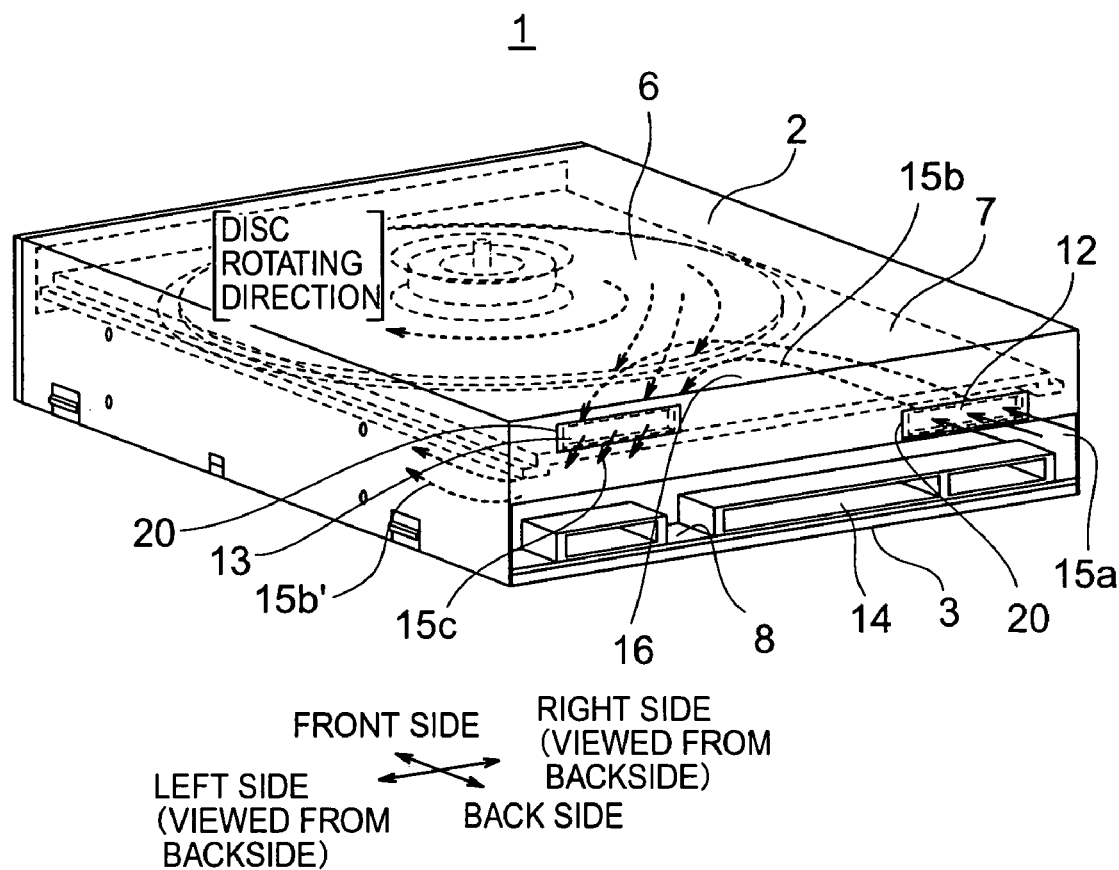
FIG. 12 is an outside perspective view of a still further embodiment of the optical disc drive according to the present invention.

FIG. 12 is an outside perspective view of a still further embodiment of the optical disc drive according to the present invention.

According to this embodiment, dust-proof filters 20 are added to the outer surfaces of the first opening 12 arranged at the lower right and the second opening 13 arranged at the upper left of the back surface of the housing as with the first embodiment. By these filters, dust within the introduced air is removed efficiently during operation and non-operation of the drive. Preferably, the filter 20 should be made of a thin object such as a nonwoven fabric having a good balance of dust-removing performance and flow resistance. However, it is possible to adjust the amount of introduced outside air properly by varying an opening area considering the increase in the flow resistance so as to obtain the improvement in performance and efficiency of internal cooling of the drive as with the first embodiment. Thus, this embodiment can prevent adverse effects caused by irruption of dust within the introduced air, while keeping higher cooling performance by the simple configuration of installing the filters in the intake and exhaust openings.

The present invention can be used for an optical disc drive.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc drive comprising:

a housing;

a tray able to be drawn from a front surface of the housing to place a disc on a top surface thereof;

a disc rotation mechanism arranged under the proximity to the top surface of the tray within the housing to rotate the disc clockwise viewed from above; and a pickup arranged under the tray and behind a rotation axis of the disc rotation mechanism in the housing being movable frontward and backward of the housing, wherein the tray is almost in a rectangular shape which partitions the housing in a vertical direction and has an internal opening extending in the proximity to the rotation axis of the disc rotation mechanism and in a moving range of the pickup, and the housing has only two openings on a back surface thereof that consist of a first opening placed on a right side of the back surface viewed from its backside, and in a height range between a bottom surface of the tray and the proximity to a bottom end of the pickup, and a second opening placed on a left side of the back surface viewed from the backside, and in a height range between the top surface of the housing and the top surface of the tray, so that the second opening is placed on a diagonal opposite side to the first opening on the back surface of the housing, wherein outside air is introduced to the proximity of the pickup through the first opening and air in the proximity of the pickup is discharged through the second opening.

* * * * *